United States Patent
Ueda et al.

(10) Patent No.: US 6,488,736 B2
(45) Date of Patent: Dec. 3, 2002

(54) METHOD OF PRODUCING SINTERED METAL SPROCKET AND SPROCKET PRODUCED BY THE METHOD

(75) Inventors: Katsuhiko Ueda, Chiba (JP); Makoto Iwakiri, Chiba (JP); Yoshimi Sugaya, Chiba (JP); Yutaka Mabuchi, Kanagawa (JP); Masato Yamaguchi, Kanagawa (JP); Akira Fujiki, Yokohama (JP); Yukihiro Maekawa, Yokohama (JP); Masakazu Wada, Farmington Hills, MI (US)

(73) Assignees: Nissan Motor Co., Ltd., Yokohama (JP); Hitachi Powdered Metals Co., Ltd., Matsudo (JP)

( * ) Notice: Subject to any disclaimer, the term of this patent is extended or adjusted under 35 U.S.C. 154(b) by 0 days.

(21) Appl. No.: 09/810,563

(22) Filed: Mar. 19, 2001

(65) Prior Publication Data
US 2001/0038801 A1 Nov. 8, 2001

(30) Foreign Application Priority Data
Apr. 11, 2000 (JP) ........................................ 2000-109561

(51) Int. Cl.$^7$ .................................................. B22F 3/00
(52) U.S. Cl. .............................. 75/246; 75/243; 419/11; 419/29; 419/38
(58) Field of Search ............................. 75/246; 419/11, 419/29, 38

(56) References Cited

U.S. PATENT DOCUMENTS

| | | | | |
|---|---|---|---|---|
| 5,154,881 A | * | 10/1992 | Rutz et al. | 419/37 |
| 5,290,508 A | * | 3/1994 | Kobayashi et al. | 419/54 |
| 5,540,883 A | * | 7/1996 | Jones et al. | 419/28 |
| 5,613,180 A | * | 3/1997 | Kosco | 419/5 |
| 5,729,822 A | * | 3/1998 | Shivanath et al. | 428/551 |
| 5,744,433 A | * | 4/1998 | Storstrom et al. | 508/454 |
| 5,782,954 A | * | 7/1998 | Luk | 75/252 |
| 5,997,805 A | * | 12/1999 | Lawcock et al. | 419/28 |
| 6,171,546 B1 | * | 1/2001 | Mars et al. | 419/38 |
| 6,299,690 B1 | * | 10/2001 | Mongeon et al. | 118/622 |
| 6,332,904 B1 | * | 12/2001 | Fujiki et al. | 75/243 |

FOREIGN PATENT DOCUMENTS

JP     7-112231     5/1995

* cited by examiner

*Primary Examiner*—Ngoclan Mai
(74) *Attorney, Agent, or Firm*—Foley & Lardner

(57) ABSTRACT

A sintered metal sprocket for a silent chain is produced by the following steps. A base mixture is prepared, which contains a powder metallurgical iron powder, a lubricant and a graphite powder. Then, the base mixture is subjected to a compression molding while being heated at above approximately 100° C. thereby to produce a green compact. Then, the green compact is subjected to a sintering at a temperature above approximately 1180° C. For much improving the mechanical performance of the sprocket thus sintered, the same may be subjected to a carbonizing hardening or an induction hardening.

12 Claims, 1 Drawing Sheet

METHOD OF PRODUCING SINTERED METAL SPROCKET AND SPROCKET PRODUCED BY THE METHOD

BACKGROUND OF THE INVENTION

1. Field of the Invention

The present invention relates in general to a powder metallurgy technology for producing sintered articles, and more particularly to a method of producing a sintered metal sprocket and a sprocket produced by the method, which is suitable for a silent chain used in an internal combustion engine or the like. More specifically, the present invention is concerned with a method of producing a sintered metal sprocket which has excellent wear and abrasion resistance.

2. Description of the Prior Art

As one of methods of increasing mechanical strength of sintered metal parts, Laid-Open Japanese Patent Publication 7-112231 shows a technique for increasing the strength of a sintered metal gear. That is, in the technique, the crystal grains gathering near each tooth of the gear are made minute and the mechanical strength of each tooth, particularly, the fatigue strength of the root of each tooth is increased. That is, in the method, after being heated to an austenitizing range, the peripheral portion of a circular blank of the gear is subjected to a hot form rolling to form teeth around the blank. Furthermore, as the need arises, the circular blank is subjected to a preparatory hot form rolling, before the major hot rolling, for obtaining much minute formation of the crystal grains or after the hot form rolling, the gear is subjected to an induction hardening for obtaining much hardened teeth of the gear.

BRIEF DESCRIPTION OF THE INVENTION

The method described in the above-mentioned publication makes no mention of the improvement in wear and abrasion resistance of the teeth of the sintered gear. In other words, the technique of the publication can not be directly applied to a method for producing a sintered metal sprocket for a silent chain where high wear and abrasion resistance of the teeth of the sprocket is highly needed.

Hitherto, meshing between a sintered metal sprocket and a silent chain has been analyzed. By this analyzation, it has been revealed that a slippage between the sprocket and the silent chain is caused by a sliding movement of each unit of the link plates of the chain in a direction from the addendum to the dedendum of the sprocket upon receiving a certain impact. Furthermore, it has been also revealed that during the sliding movement of the link plates, side edges of each unit of the link plates is forced to make a point contact with each tooth of the sprocket against a bearing stress of over 0.4 Gpa. Furthermore, by making a detailed observation on the abrasion of the teeth of sintered metal sprockets, it has been revealed that as service duration increases, minute holes in the sintered body become merged thereby triggering a so-called peeling abrasion of the teeth of the sprocket. This abrasion manner is considered quite unique differing from that occurring in a sprocket for a roller chain or when two gears mesh each other.

In view of the above-mentioned revelation and consideration, the applicants have concluded that a satisfied wear and abrasion resistance of the teeth of sintered metal sprockets is not obtained by only fining the crystal grains. Furthermore, the applicants have revealed that an ordinary hot form rolling does not provide a deterrent against the abrasion of the teeth because the ordinary form rolling fails to bring about metallurgical connection between the crystal grains, and revealed that the induction hardening after hot form rolling does not provide a deterrent against the peeling abrasion of the teeth.

Thus, an object of the present invention is to provide a sintered metal sprocket for a silent chain and a method of producing the same, which are provided by embodying the above-mentioned revelation and consideration.

According to the present invention, there is provided a sintered metal sprocket for a silent chain, whose tooth portion shows a satisfied performance in mechanical strength, particularly in wear and abrasion resistance.

According to the present invention, there is further provided a method for producing a sintered metal sprocket for a silent chain, that has such a satisfied mechanical strength.

According to a first aspect of the present invention, there is provided a method of producing a sintered metal sprocket for a silent chain. The method comprises preparing a base mixture which contains a metallurgical iron powder, a lubricant and a graphite powder; subjecting the base mixture to a compression molding while heating the same above approximately 100° C. thereby to produce a green compact; and sintering the green compact at a temperature above approximately 1180° C. to produce the sintered metal sprocket.

According to a second aspect of the present invention, there is provided a method of producing a sintered metal sprocket for a silent chain. The method comprises preparing a base mixture which contains a metallurgical iron powder, a lubricant and a graphite powder, the metallurgical iron powder containing in weight ratio 2.0% to 5.0% of Ni (nickel), 0.2% to 1.0% of Mo (molybdenum), 0.5% to 2.0% of Cu (copper), 1% of C (carbon) and residue of Fe (iron) and impurities, the metal grains of Ni, Mo and Cu being diffusion-bonded onto each grain of Fe; subjecting the base mixture to a compression molding while heating the same above approximately 100° C. thereby to produce a green compact of sprocket; and sintering the green compact of sprocket at a temperature above approximately 1180° C. to produce the sintered metal sprocket.

According to a third aspect of the present invention, there is provided a method of producing a sintered metal sprocket for a silent chain. The method comprises preparing a base mixture which contains a metallurgical iron powder, a lubricant and a graphite powder, metallurigical iron powder containing in weight ratio 0.5% to 3.0% of Ni, 0.5% to 2.0% of Mo, 1% of C and residue of Fe and impurities, the metal grains of Ni being diffusion-bonded to each alloyed grain of Fe and Mo; subjecting the base mixture to a compression molding while heating the same above approximately 100° C. thereby to produce a green compact of sprocket; and sintering the green compact of sprocket at a temperature above approximately 1180° C. to produce the sintered metal sprocket.

DETAILED DESCRIPTION OF THE INVENTION

In the following, method of producing a sintered metal sprocket of the present invention will be described in detail with reference to five examples and four references. The sintered metal sprockets produced were for use with a silent chain of an internal combustion engine.

EXAMPLE-1

First, a metallurgical iron powder was prepared, which contained, in weight ratio, about 4% of Ni (viz., nickel), about 0.5% of Mo (viz., molybdenum), about 2% of Cu (viz., copper), about 1% of C (viz., carbon) and residue of Fe (viz., iron) and impurities and in which the metal grains of Ni, Mo and Cu were diffusion-bonded onto each grain of Fe. The iron powder was mixed with a lubricant and a graphite powder to prepare a base mixture. Then, the base mixture was heated to about 130° C., put into a metallic mold of about 150° C. and subjected to a compression molding. With this process, a green compact of a sprocket having twenty two teeth was molded. Then, the molded green compact was sintered at a temperature of about 1195° C. With this, a sintered metal sprocket of EXAMPLE-1 was produced.

The sprocket thus produced was actually applied to a conventional gasoline type internal combustion engine to examine an abrasion loss of the tooth portion of the sprocket.

For this examination, the engine was operated in the following condition.

Tension applied to a silent chain . . . 1500N (one sided tensioning)

Engine speed . . . 6000 rpm

Duration of test . . . 100 hrs

Lubrication oil used . . . 5W-30SG

Temperature of oil . . . 110° C.

Figure 1:
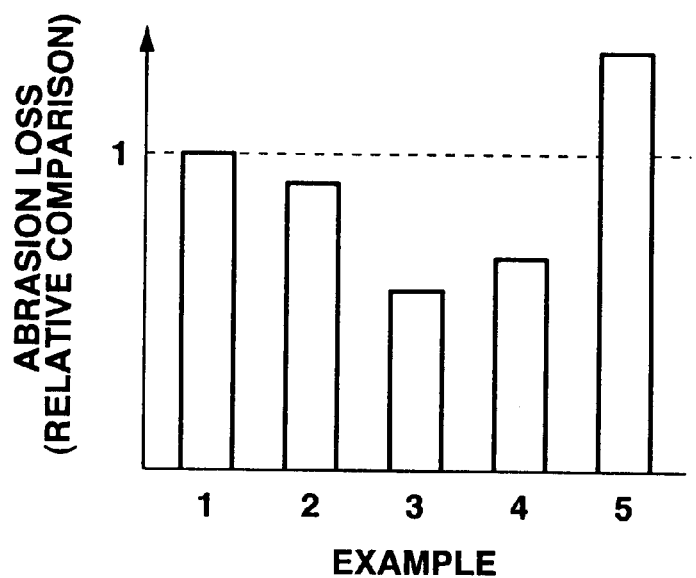
FIG. 1 is a graph showing abrasion loss of five sintered metal sprockets produced according to the present invention.

The result of the examination is shown in the graph of FIG. 1. It is to be noted that in FIGS. 1 and 2, the results (viz., abrasion loss) of other EXAMPLES and REFERENCES are represented with respect to the result of EXAMPLE-1 as being represented by 1 (one).

By carrying out the same process as the above, identical sprockets were produced and test pieces were cut out from these sprockets. These test pieces were subjected to performance tests to measure hardness, density, tensile strength and impact strength (viz., Charpy impact strength) thereof, which are shown in TABLE-1 shown in page 12.

EXAMPLE-2

First, a metallurgical iron powder was prepared, which contained, in weight ratio, about 2% of Ni, about 1.5% of Mo, about 1% of C and residue of Fe and impurities and in which the metal grains of Ni were diffusion-bonded onto each alloyed grain of Fe-Mo. The iron powder was mixed with a lubricant and a graphite powder to prepare a base mixture. Then, the base mixture was subjected to a compression molding under the same condition as that described in EXAMPLE-1 thereby to produce a molded green compact. The molded green compact was sintered at a temperature of about 1180° C. With this, a sintered metal sprocket of EXAMPLE-2 was produced. The sprocket thus produced was actually applied to the engine to examine an abrasion loss of the tooth portion of the sprocket. The result of the examination is shown in FIG. 1. Test pieces cut out from identical sprockets were subjected to the performance tests. The results of the tests are shown in TABLE-1.

EXAMPLE-3

A molded green compact identical to that of the above-mentioned EXAMPLE-2 was prepared. The green compact was sintered at a temperature of about 1260° C. to produce a sintered metal sprocket. The sprocket was then subjected to a carbonizing hardening and a tempering. With this, a sintered metal sprocket of EXAMPLE-3 was produced. Abrasion loss of the sprocket is shown in FIG. 1, and the results of the performance tests are shown in TABLE-1.

EXAMPLE-4

A molded green compact identical to that of the above-mentioned EXAMPLE-1 was prepared. The green compact was sintered at a temperature of about 1200° C. to prepare a sintered metal sprocket. Then, the sprocket was subjected to an induction hardening and a tempering. With this, a sintered metal sprocket of EXAMPLE-4 was produced. Abrasion loss of the sprocket is shown in FIG. 1, and the results of the performance tests are shown in TABLE-1.

EXAMPLE-5

First, a metallurgical iron powder was prepared, which contained, in weight ration, about 2% of Ni, about 1% of Cu, about 1% of C and residue of Fe and impurities. The powder was mixed with a lubricant and a graphite powder to prepare a base mixture. Then, the base mixture was subjected to a compression molding under the same condition as that described in EXAMPLE-1 thereby to produce a molded green compact. The molded green compact was then sintered at a temperature of about 1180° C. With this, a sintered metal sprocket of EXAMPLE-5 was produced. Abrasion loss of the sprocket is shown in FIG. 1, and the results of the performance tests are shown in TABLE-1.

In order to clarify advantages given by the present invention, comparative attempts, viz., references, were also carried out, which are as follows.

REFERENCE-1

Figure 2:
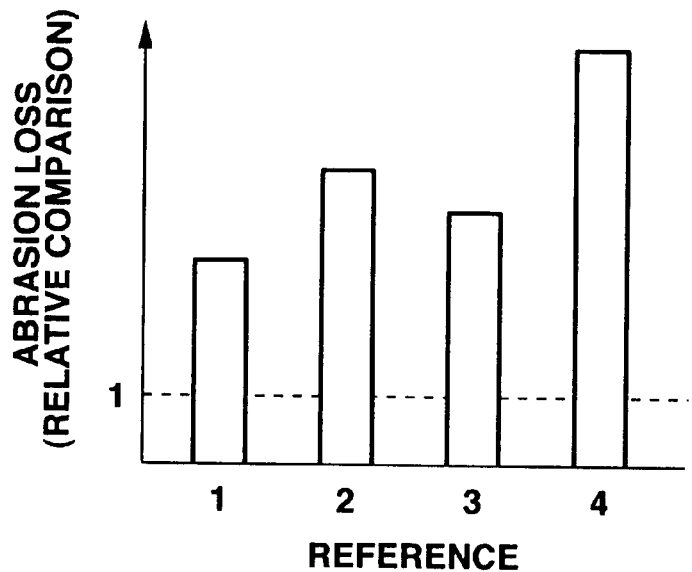
FIG. 2 is a graph similar to FIG. 1, but showing the abrasion loss of four references.

A molded green compact identical to that of the above-mentioned EXAMPLE-2 was prepared. The green compact was sintered at a temperature of about 1140° C. With this, a sintered metal sprocket of REFERENCE-1 was produced. Abrasion loss of the sprocket is shown in FIG. 2, and the results of the performance tests are shown in TABLE-1 of page 12.

REFERENCE-2

A base mixture identical to that of the above-mentioned EXAMPLE-1 was prepared. Without being heated, the base mixture was subjected to a compression molding at room temperature (about 16° C.) to prepare a molded green compact. The molded green compact was then sintered at a temperature of about 1195° C. With this, a sintered metal sprocket of REFERENCE-2 was produced. Abrasion loss of the sprocket is shown in FIG. 2, and the results of the performance tests are shown in TABLE-1.

REFERENCE-3

A sintered metal sprocket identical to that of the above-mentioned REFERENCE-2 was prepared. The sintered metal sprocket was then subjected to an induction hardening and a tempering. With this, a sintered metal sprocket of REFERENCE-3 was produced. Abrasion loss of the sprocket is shown in FIG. 2 and the results of the performance tests are shown in TABLE-1.

REFERENCE-4

A base mixture identical to that of the above-mentioned EXAMPLE-2 was prepared. Without being heated, the base mixture was subjected to a compression molding at room temperature (about 16° C.) to prepare a molded green compact. The molded green compact was then sintered at a temperature of 1140° C. to produce a sintered metal sprocket. Then, the sprocket was subjected to a carbonizing hardening and a tempering. With this, a sintered metal sprocket of REFERENCE-4 was produced. Abrasion loss of the sprocket is shown in FIG. 2, and the results of the performance tests are shown in TABLE-1.

As is seen from FIGS. 1 and 2, the sintered metal sprockets of EXAMPLES-1 to -5, especially the sprockets of EXAMPLES-3 and -4, showed excellent durability against the abrasion, while, the sintered metal sprockets of all of REFERENCES-1 to -4 showed poor durability against the abrasion. These facts are supported by the results of the performance tests, as is seen from TABLE-1. That is, the density, tensile strength and impact strength of the sprockets of EXAMPLES-1 to -5 are higher than those of the sprockets of REFERENCES-1 to -4. The hardness of the sprockets of EXAMPLES-1 to -5 is slightly higher than or at least equal to that of the REFERENCES-1 to -4. Regarding the impact strength, all of the sprockets of EXAMPLES-1 to -5 show excellency as compared with those of REFERENCES-1 to -4. Furthermore, as to the tensile strength, the sprockets of EXAMPLES-3 and -4 (which were subjected to carbonizing or induction hardening) show excellency.

From the above-described experiments, the followings are concluded.

For obtaining a desired sintered metal sprocket for a silent chain, the base mixture is heated to above 100° C. and subjected to a compression molding using a metallic mold of over 120° C., and then, the molded green compact was sintered at a temperature above 1180° C.

As the base mixture, a metallurgical iron powder mixed with a lubricant and a graphite powder is used, in which the iron powder contains, in weight ratio, about 2.0% to about 5.0% of Ni, about 0.2% to about 1.0% of Mo, about 0.5% to about 2.0% of Cu, about 1% of C and residue of Fe and impurities, and in which the metal grains of Ni, Mo and Cu are diffusion-bonded onto each grain of Fe. Preferably, as the metallurgical iron powder, an iron powder is used which includes in weight ratio about 0.5% to about 3.0% of Ni, about 0.5% to about 2.0% of Mo, about 1% of C and residue of Fe and impurities and in which the metal grains of Ni are diffusion-bonded onto each alloyed grain of Fe-Mo.

For achieving excellent durability against abrasion, the sintered metal sprocket is subjected to an induction hardening or carbonizing hardening. When having over 700 MPa in tensile strength and over 20 J/cm² in Charpy impact strength, the sintered metal sprocket can exhibit a satisfied durability against abrasion.

In the following, consideration will be directed to the advantages possessed by the present invention.

The compression molding of the base mixture is carried out at a temperature above 100° C. With this, the compactness of the molded green compact is increased, so that each minute hole in the green compact becomes reduced in size and at the same time the contact area between the grains becomes increased. Then, the molded green compact is sintered at a temperature above 1180° C. During this, the diffusion between the grains becomes vigorous resulting, so that the degree of cohesion between grains is highly increased as compared with that in the above-mentioned conventional process. That is, due to reducing in size of the minute holes and increase of the cohesion degree between grains, the sintered metal sprocket thus produced can exhibit an excellent mechanical strength, for example, over 700 Mpa in tensile strength and over 20 J/cm² in Charpy impact strength. Thus, the peeling abrasion of the sprocket, which occurs when engaged with a silent chain, is greatly reduced. The purpose of heating the mold (viz., die, punch, etc.,) to over 120° C. at the time of molding the base mixture is to avoid undesired temperature drop of the heated base mixture. If the temperature of the mold is lower than 120° C., the temperature of the heated base mixture may lower below 100° C. during the molding.

As the base mixture, a metallurgical iron powder mixed with a lubricant and a graphite powder is used, in which the iron powder contains, in weight ratio, about 2.0% to 5.0% of Ni, about 0.2% to about 1.0% of Mo, about 0.5% to about 2.0% of Cu, about 1% of C and residue of Fe and impurities, and in which the metal gains of Ni, Mo and Cu are diffusion-bonded onto each grain of Fe.

By Ni, the density and toughness of the produced sintered body are increased. However, if the amount of Ni is less than 2.0%, satisfied effect is not obtained, and if the amount exceeds 5.0%, the effect is saturated and undesired segregation tends to occur. By Mo, the hardening of the produced sintered body is improved. However, if the amount of Mo is less than 0.2%, satisfied effect is not obtained, and if the amount exceeds 1.0%, undesired segregation occurs, which tends to bring about embrittlement of the sintered body. By Cu, the density and toughness of the produced sintered body are increased due to tendency toward generation of liquid phase. However, if the amount of Cu is less than 0.5%, satisfied effect is not obtained, and if the amount exceeds 2.0%, dimension stability of the produced sintered body becomes poor, that is, marked expansion takes place upon sintering.

By using the iron powder of the type wherein the metal grains of Ni, Mo and Cu are diffusion-bonded to each grain of Fe, homogeneity is easily obtained by the base mixture as compared with a conventional iron powder which contains a mixture of Ni, Mo and Cu. Thus, the base mixture has a high compressibility.

As the base mixture, another metallurgical iron powder mixed with a lubricant and a graphite powder is also usable, in which the iron powder contains, in weight ratio, about 0.5% to 3.0% of Ni, about 0.5% to 2.0% of Mo, about 1% of C and residue of Fe and impurities, and in which the metal gains of Ni are diffusion-bonded onto each alloyed grain of Fe and Mo.

By Ni, the density and toughness of the produced sintered body are increased. However, if the amount of Ni is less than 0.5%, satisfied effect is not obtained, and if the amount exceeds 3.0%, the effect is saturated and undesired segregation tends to occur. By Mo, the hardening of the produced sintered body is improved. However, if the amount of Mo is less than 0.5%, satisfied effect is not obtained, and if the amount exceeds 2.0%, the compressibility of the base mixture becomes poor.

By using the iron powder of the type wherein the metal grains of Ni are diffusion-bonded to each alloyed grain of Fe and Mo, the produced sintered body can have a much higher density and toughness. That is, under sintering, the grains of Ni are forced to diffuse over the alloyed grains of Fe and Mo, which seems to bring about such desired effect.

When the sintered body is subjected to a carbonizing or induction hardening and a tempering, surface hardness of each tooth of the sprocket is much increased. This brings about reduction in adhesive wear of the teeth. That is, due to combination of the sintering and the hardening, the wear and abrasion resistance of the produced sintered sprocket is highly increased.

The entire contents of Japanese Patent Application 2000-109561 (filed Apr. 11, 2000) are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A method of producing a sintered metal sprocket for a silent chain, comprising:

preparing a base mixture which contains a metallurgical iron powder, a lubricant and a graphite powder, said metallurgical iron powder containing in weight ratio 2.0% to 5.0% of Ni (nickel), 0.2% to 1.0% of Mo (molybdenum), 0.5% to 2.0% of Cu (copper), 1% of C (carbon) and residue of Fe (iron) and impurities, the metal grains of Ni, Mo and Cu being diffusion-bonded onto each grain of Fe;

subjecting said base mixture to a compression molding while heating the same above approximately 100° C. thereby to produce a green compact of sprocket; and sintering the green compact of sprocket at a temperature above approximately 1180° C. to produce a sintered metal sprocket.

2. A method as claimed in claim 1, further comprising, after the step of sintering, subjecting the sintered metal sprocket thus produced to a hardening and a tempering.

3. A method of producing a sintered metal sprocket for a silent chain, comprising:

preparing a base mixture which contains a metallurgical iron powder, a lubricant and a graphite powder, metallurgical iron powder containing in weight ratio 0.5% to 3.0% of Ni, 0.5% to 2.0% of Mo, 1% of C and residue of Fe and impurities, the metal grains of Ni being diffusion-bonded to each alloyed grain of Fe and Mo;

subjecting said base mixture to a compression molding while heating the same above approximately 100° C. thereby to produce a green compact of sprocket; and sintering the green compact of sprocket at a temperature above approximately 1180° C. to produce a sintered metal sprocket.

4. A method as claimed in claim 3, further comprising, after the step of sintering, subjecting the sintered metal sprocket thus produced to a hardening and a tempering.

5. A method as claimed in claim 1, in which the compression molding is carried out by using a mold heated above approximately 120° C.

6. A method as claimed in claim 5, further comprising, after the step of sintering, subjecting the sintered metal sprocket thus produced to a hardening and a tempering.

7. A method as claimed in claim 2, in which said hardening is a carbonizing hardening or an induction hardening.

8. A method as claimed in claim 3, in which the compression molding is carried out by using a mold heated above approximately 120° C.

9. A method as claimed in claim 8, further comprising, after the step of sintering, subjecting the sintered metal sprocket thus produced to a hardening and a tempering.

10. A method as claimed in claim 4, in which said hardening is a carbonizing hardening or an induction hardening.

11. A sintered metal sprocket for a silent chain, which is produced by preparing a base mixture which contains a metallurgical iron powder, a lubricant and a graphite powder; subjecting the base mixture to a compression molding while heating the same above approximately 100° C. thereby to produce a green compact; and sintering the green compact at a temperature above approximately 1180° C. to produce the sintered metal sprocket, wherein said sintered metal sprocket has over 700MPa in tensile strength and over 20J/cm² in Charpy impact strength and wherein said metallurgical iron powder containing in weight ratio 2.0% to 5.0% of Ni (nickel), 0.2% to 1.0% of Mo (molybdenum), 0.5% to 2.0% of Cu (copper), 1% of C (carbon) and residue of Fe (iron) and impurities, and the metal grains of Ni, Mo and Cu being diffusion-bonded onto each grain of Fe.

12. A sintered metal sprocket for a silent chain, which is produced by preparing a base mixture which contains a metallurgical iron powder, a lubricant and a graphite powder; subjecting the base mixture to a compression molding while heating the same above approximately 100° C. thereby to produce a green compact; and sintering the green compact at a temperature above approximately 1180° C. to produce the sintered metal sprocket, wherein said sintered metal sprocket has over 700MPa in tensile strength and over 20J/cm² in Charpy impact strength and wherein said metallurgical iron powder containing in weight ratio 0.5% to 3.0% of Ni, 0.5% to 2.0% of Mo, 1% of C and residue of Fe and impurities, and the metal grains of Ni being diffusion-bonded to each alloyed grain of Fe and Mo.

* * * * *